United States Patent [19]

Najmr et al.

[11] Patent Number: 4,474,737

[45] Date of Patent: Oct. 2, 1984

[54] PROCESS OF PURIFICATION OF MAGNESIC RAW MATERIAL

[75] Inventors: Stanislav Najmr, Prague; Zdenek Jerman, Usti n/L.; Jaroslav Kralicek, Prague, all of Czechoslovakia

[73] Assignee: Vysoka, skola chemiko-technologicka, Prague, Czechoslovakia

[21] Appl. No.: 457,046

[22] Filed: Jan. 10, 1983

[30] Foreign Application Priority Data

Jan. 14, 1982 [CS] Czechoslovakia ..................... 297-82

[51] Int. Cl.$^3$ ................................................. C01D 5/16
[52] U.S. Cl. .................................. 423/155; 23/293 R; 23/304; 423/173; 423/242; 423/512 A
[58] Field of Search ............... 423/173, 242 A, 512 A, 423/155; 23/293 R, 304

[56] References Cited

U.S. PATENT DOCUMENTS

| | | | |
|---|---|---|---|
| 338,558 | 3/1886 | Ritter et al. | 423/512 A |
| 690,503 | 1/1902 | Wing | 423/512 A |
| 2,801,900 | 8/1957 | Benning et al. | 423/512 A |
| 3,085,858 | 4/1963 | Trubey et al. | 423/512 A |
| 3,653,823 | 4/1972 | Shah | 423/242 A |
| 3,655,338 | 4/1972 | Shah | 423/155 |
| 3,679,362 | 7/1972 | Hartmann et al. | 423/169 |
| 3,758,668 | 9/1973 | Lapple et al. | 423/242 A |
| 4,046,856 | 9/1977 | Itoo et al. | 423/242 A |
| 4,108,959 | 8/1978 | Tatani et al. | 423/242 A |
| 4,154,802 | 5/1979 | Brandt et al. | 423/173 |

OTHER PUBLICATIONS

Kirk–Othmer, *Encyclopedia of Chemical Technology,* Second Edition, vol. 12, (1967), Interscience Publishers, pp. 729, 730.

*Primary Examiner*—John Doll
*Assistant Examiner*—Wayne A. Langel

[57] ABSTRACT

Process of purification of magnesic raw material. Sulphur dioxide is allowed to react with an aqueous suspension of calcinated magnesite, crude or contaminated magnesium oxide, magnesium hydroxide, hydrated magnesium carbonates, or crude crystals of magnesium sulphite, and, after reaching a pH of 3 to 7.5 the reaction mixture is separated into a solid phase at least one fraction of which is rich in $MgSO_3.xH_2O$, wherein x stands for 3 or 6, and at least one fraction containing concentrated impurities. The whole process is carried out at least once. A reaction mixture having a pH below 5 can be preferably transferred to pH 5.2 by the addition of an alkali, e.g. magnesium oxide or magnesium hydroxide, whereupon separation of at least two fractions of the solid phase is accomplished. The fractions obtained can be further purified by mixing in a hydrophilic liquid, and by a following separation. The fraction of crude magnesium sulphite crystals can be heated to a temperature over 60 degress C., preferably to 90 to 100 degrees C., whereupon the solution containing magnesium sulphite is separated from solid impurities, or the treated mixture is cooled to a temperature below 60 degrees C. and solid phases are separated into one or more fractions rich in $MgSO_3.xH_2O$ and to one or more fractions mainly containing impurities. Filtration, sedimentation, or centrifugation can be used for the separation.

8 Claims, No Drawings

PROCESS OF PURIFICATION OF MAGNESIC RAW MATERIAL

Magnesite is the most important natural magnesic raw material. Before its industrial employment, it is usually treated by calcination in order to produce magnesium oxide, which has more advantageous physical and chemical properties. The traditional production of magnesite refractory linings is based on this, and calcinated magnesite is also now used in the desulphurization of flue gases and in the production of cellulose by magnesium bisulphite technology.

Serious difficulties are caused by impurities in all these cases; such impurities are contained in natural magnesite in the amount of 5 to 25% by weight. This is why several technologies for producing pure magnesium oxide from magnesite have been proposed. Nevertheless, these have the drawback that they consume expensive chemicals (e.g. $HNO_3$ and $NH_3$ in the case of nitrate technology); less valuable by-products are produced, and they are more demanding as far as investment and energy are concerned.

These drawbacks are eliminated by the process of separation of impurities in the treatment of calcinated magnesite, contaminated magnesium oxide, magnesium hydroxide, or hydrated magnesium carbonates in accordance with the invention. In such method sulphur dioxide is allowed to react with an aqueous suspension of calcinated magnesite, contaminated magnesium oxide, magnesium hydroxide, hydrated magnesium carbonates, crude crystals of magnesium sulphite, or with an aqueous suspension of a mixture of these compounds. After reaching a pH of 3 to 7.5 the reaction mixture of the solid phase is separated into one or more fractions rich in $MgSO_3.xH_2O$ wherein x stands for 3 or 6, and into one or more fractions mainly containing impurities, the whole process being carried out at least once.

Calcinate of magnesium sulphite can, for example, also serve as the contaminated magnesium oxide; such sulphite originates in the magnesite process of desulphurization of air pollutants. Besides impurities originating from magnesite, it also contains impurities caught from desulphurized air pollutants such as fly-as from waste gases.

The invention utilizes the known fact that $MgSO_3$ has a very low solubility in water. A metastable solution can, however, be prepared under certain, relatively easily realizable conditions, from which solution crystallohydrate $MgSO_3$ with 3 or 6 molecules of crystal water and appreciably different sizes of crystals can be prepared under specific conditions. $MgSO_3.3H_2O$ has a crystal size of around 0.01 mm and $MgSO_3.6H_2O$ has a crystal size of around 1 mm. Different sizes of particles and densities thereof permit the separation of solid impurities with a wide range of densities from magnesium sulphite crystals using one-stage crystallization or repeated crystallization, if need be, followed by sedimentation, filtration or centrifugation.

For example, in the treatment of magnesites of the silicate type, it is advantageous to treat $MgSO_3.3H_2O$ because the $SiO_2$ contained in it is present in a coarse form, and it is easily separated from the fine $MgSO_3.3H_2O$. On the contrary, in the case in which the ferric type of magnesite is treated, or when it is necessary above all to separate iron, it is advantageous to operate in the region of $MgSO_3.6H_2O$, because fine ferruginous sludge is produced from which rough crystals are also easily separated.

A very fine sludge of impurities is produced by over acidification, for example, by introducing an excess of $SO_2$ below a pH=5, the pH being then raised to a pH over 5.2 by the addition of al alkali. Temporary dissolution of impurities, especially of iron, takes place by reason of over-acidification; their repeated precipitation takes place in a fine form, which form is easily separable from rough crystals.

In the separation of impurities by the process according to the invention, sometimes, contrary to the above, a part of the impurities is stripped into the fraction containing sulphite crystals. It is then possible to subject the fraction obtained by separation to repeated separation in a second or even a still further stage. Separation of impurities is further improved by a simple operation. A part of the impurities can be contained in the original sulphite crystals, that is, it can be a part of the crystals themselves. These impurities are not then separated by the above described separation. In this case, magnesium sulphite crystals are transferred into a liquid phase (they are dissolved) and then they are again separated. Substantially purer crystals are thus formed, and solid impurities are then separated from them; this can be simply carried out by allowing sulphur dioxide to react with a suspension containing magnesium sulphite whereby water-soluble $Mg/HSO_3/_2$ is formed, which is transferred back to $MgSO_3$ by an alkali addition, preferably $MgO$ or $Mg/OH/_2$, so that magnesium sulphite crystallizes out. Alternatively, it is possible to dissolve the aqueous suspension of the crude magnesium sulphite crystals by heating them to a temperature over 60 degrees C., preferably to 90 to 100 degrees C.; solid impurities are then removed from magnesium sulphite by separation.

The process for the purification of magnesium raw materials according to the invention is simple, undemanding as far as investment and energy are concerned, and very effective. The transformation of magnesium raw material to magnesium sulphite is a precondition; however, magnesium sulphite is an intermediate or by-product of several known and industrially employed technologies. In such cases, the employment of the process according to the invention is very easy, and the given technology gains wholly new possibilities without appreciable disadvantages. Thus, for example, in the desulphurization of the waste gases from thermal power stations by the magnesite process, magnesium sulphite is formed as an intermediate; such sulphite is thermally split to magnesium oxide and sulphur dioxide. Magnesium oxide, however, contains approximately 30% be weight of impurities, so that it is unusable as a product. When this crude magnesium sulphite is purified by the process according to the invention, magnesium oxide containing up to 99.5% by weight of MgO is obtained; this is a required product, for example, in the rubber industry, in the production of transformer sheets, or in the production of sintered magnesia.

EXAMPLE 1

1 $m^3$ of water was placed in a glass reactor having a conical bottom and a cooling coil; 71 kg of calcinated magnesite (composition: 77.2% of MgO, 4.1% of $SiO_2$, 2.3% of CaO, 7.14% of $R_2O_3$, 8.1% of losses at annealing, all percentages being by weight) was fed into the reactor, and $SO_2$ from a supply thereof stored under pressure in a container was introduced under stirring.

The reaction course was followed by the determination of the pH of the reaction mixture. The pH fell from the initial value of 8.5 to 6 within 15 minutes; the temperature was kept at 35 degree C. by cooling. Stirring was then stopped, and the contents of the reactor were allowed to rest. A light layer of crystals quickly grew in the conical bottom of the reactor, a layer of deeply brown suspension was present above the layer of crystals. The depth of the layer of light crystals did not increase after 3 minutes; the light crystal layer was discharged through the reactor bottom outlet into a stirred reservoir after one more minute. The volume of this light suspension was 0.25 m$^3$. By analytical determination and microscopic observation it was found that the light crystal was $MgSO_3.6H_2O$.

The deeply brown suspension which remained in he glass reactor was allowed to settle for 30 minutes; during this time it separated into a clear upper layer having a volume of 0.6 m$^3$ and a sludge lower layer having a volume of 0.15 m$^3$. The lower layer was discharged to waste; the upper layer was left in the reactor and the suspension of $MgSO_3.6H_2O$ from the reservoir was reintroduced into it. After a short stirring, the suspension was allowed to settle for four minutes, and the lower layer having a volume of 0.25 m$^3$ containing $MgSO_3.6H_2O$ crystals was then discharged. After 30 minutes, the remaining sludge layer was also separated into fractions of a clear liquid and a brown sediment. The brown sediment, in the amount of 50 L, was discharged into waste, and 550 L of the remaining clear liquid was used for the preparation of a suspension of calcinated magnesite for the next charge.

A sample of the $MgSO_3.6H_2O$ crystals produced was calcinated at 1100 degrees C. Magnesium oxide was obtained which contained 94.0% of MgO, 2.3% of $SiO_2$, 1.6% of CaO, 1.7% of $R_2SO_3$, and 0.2% of losses by annealing, all percentages being by weight. From the mass balance, it was found that 82% by weight of the MgO contained in the raw material was transformed into $MgSO_3.6H_2O$ crystals, 3.5% by weight was transformed into drained sludges, and 14% by weight was in the liquid phase as a $MgSO_3$ solution and $MgSO_4$ formed by oxidation.

EXAMPLE 2

1 m$^3$ of water was placed in a glass reactor having a conical bottom and a cooling coil; 71 kg of calcinated magnesite (composition: 77.2% of MgO, 4.1% of $SiO_2$, 2.3% of CaO, 7.1% of $R_2O_3$, and 8.1% of losses by annealing, all percentages being by weight) was fed into the reactor and $SO_2$ from a pressure container therefor was introduced into the reactor under stirring. the pH fell from an initial value of 8.5 to 3.8 within 30 minutes, and the temperature rose to 65 degrees C. Cooling of the reactor was then started, and 72 kg of calcinated magnesite was added to the reactor within five minutes. The pH was thus raised to a value of 6.2. The temperature of the contents of the reactor was maintained within the limits of 35 to 42 degrees C. for 20 more minutes.

The contents of the reactor were mixed by a cyclone thickener for 10 minutes. 0.5 m$^3$ of $MgSO_3.6H_2O$ crystals and 0.55 m$^3$ of a suspension of brown sludge were obtained. The suspension of crystals was purified from the liquid phase using a filtration centrifuge, 250 kg of moist crystals of yellowish color being obtained. The suspension of brown sludge was filtered using a vacuum drum filter, 23.5 kg of brown filter cake being obtained.

Analytical determination revealed the following composition of the components:

|  | MgO | CaO | SiO$_2$ | Fe |
|---|---|---|---|---|
| brown cake (% by weight) | 9.1 | 5.25 | 6.44 | 8.4 |
| moist crystal (% by weight) | 18.6 | 0.43 | — | 0.21 |

EXAMPLE 3

250 kg of moist crystals obtained by the process according to Example 2 was suspended in 1.6 m$^3$ of a solution containing 5% by weight of $MgSO_4$ and saturated $MgSO_3$ at a temperature of 25 degrees C. The thus produced suspension was heated to 99 degrees C. by passing it through a tubular heat exchanger, the suspension then being lead continuously into a centrifugal filter. 1.5 m$^3$ of filtrate was obtained which was allowed to cool freely. Clear white crystals were formed in the course of cooling. The second day, when the temperature of the suspension fell to 25 degrees C., a liquid phase separated from crystals in the centrifugal filter. 220 kg of moist $MgSO_36H_2O$ crystals was obtained; such crystals contained: 17.08% of MgO, 0.1% of Fe, 0.002% of CaO, and 0.01% of $SiO_2$, all percentages being by weight.

Although the invention is illustrated and described with reference to a plurality of embodiments thereof, it is to be expressly understood that it is in no way limited to the disclosure of such preferred embodiments but is capable of numerous modification within the scope of the appended claims.

We claim:

1. A process of purification of magnesic raw materials, comprising the following steps in the order named: (1) allowing sulphur dioxide to react with an aqueous suspension of magnesic raw material chosen from the group consisting of calcinated magnesite, crude magnesium oxide, contaminated magnesium oxide, magnesium hydroxide, hydrated magnesium carbonates, crude crystals of magnesium sulphite, and mixtures of two or more of the above materials to form a solid phase composed of at least one fraction rich in $MgSO_3.XH_2O$ wherein X stands for 3 or 6, and at least one other fraction containing predominatly solid impurities, and, (2) separating the solid phase into said at least one fraction rich in $MgSO_3.XH_2O$, and into said at least one other fraction containing concentrated impurities.

2. The process according to claim 1, wherein the recited steps in the order named are repeated a plurality of times.

3. The process according to claim 1, wherein, after the reaction mixture has reached a pH below 5 the pH is adjusted to a value over 5.2 by the addition of an alkali, whereupon separation of at least two fractions of the solid phase is accomplished.

4. a process according to claim 3, wherein the alkali is chosen from the group consisting of magnesium oxide and magnesium hydroxide.

5. A process according to either of claims 1 or 4, wherein the fraction rich in $MgSO_3.xH_2O$ is mixed with a hydrophilic liquid and is subjected to further separation.

6. A process according to claim 5, comprising heating the fraction rich in $MgSO_3.xH_2O$ to a temperature over 60° C., whereupon the solution containing magnesium sulphite is separated from said impurites.

7. A process according to claim 6, wherein the fraction of crude crystals of magnesium sulphite which is mainly in the form of $MgSO_3.6H_2O$ is heated to a temperature in the range of 90 to 100 degrees C.

8. A process according to claim 1, further comprising the steps of forming an aqueous suspension of the solid fraction of magnesium sulphite crystals formed in the process of claim 1, the solid fraction being mainly in the form of $MgSO_3.6H_2O$, heating said aqueous suspension to a temperature over 60 degrees C., cooling the thus heated mixture to a temperature of below 60 degrees C., and separating the solid phase into one or more fractions rich in $MgSO_3.xH_2O$, wherein x stands for 3 or 6, and to one or more fractions mainly containing impurities.

* * * * *